C. D. MATTISON.
TRIMMING MACHINE.
APPLICATION FILED AUG. 23, 1915. RENEWED AUG. 14, 1919.
1,334,044.
Patented Mar. 16, 1920.
7 SHEETS—SHEET 1.
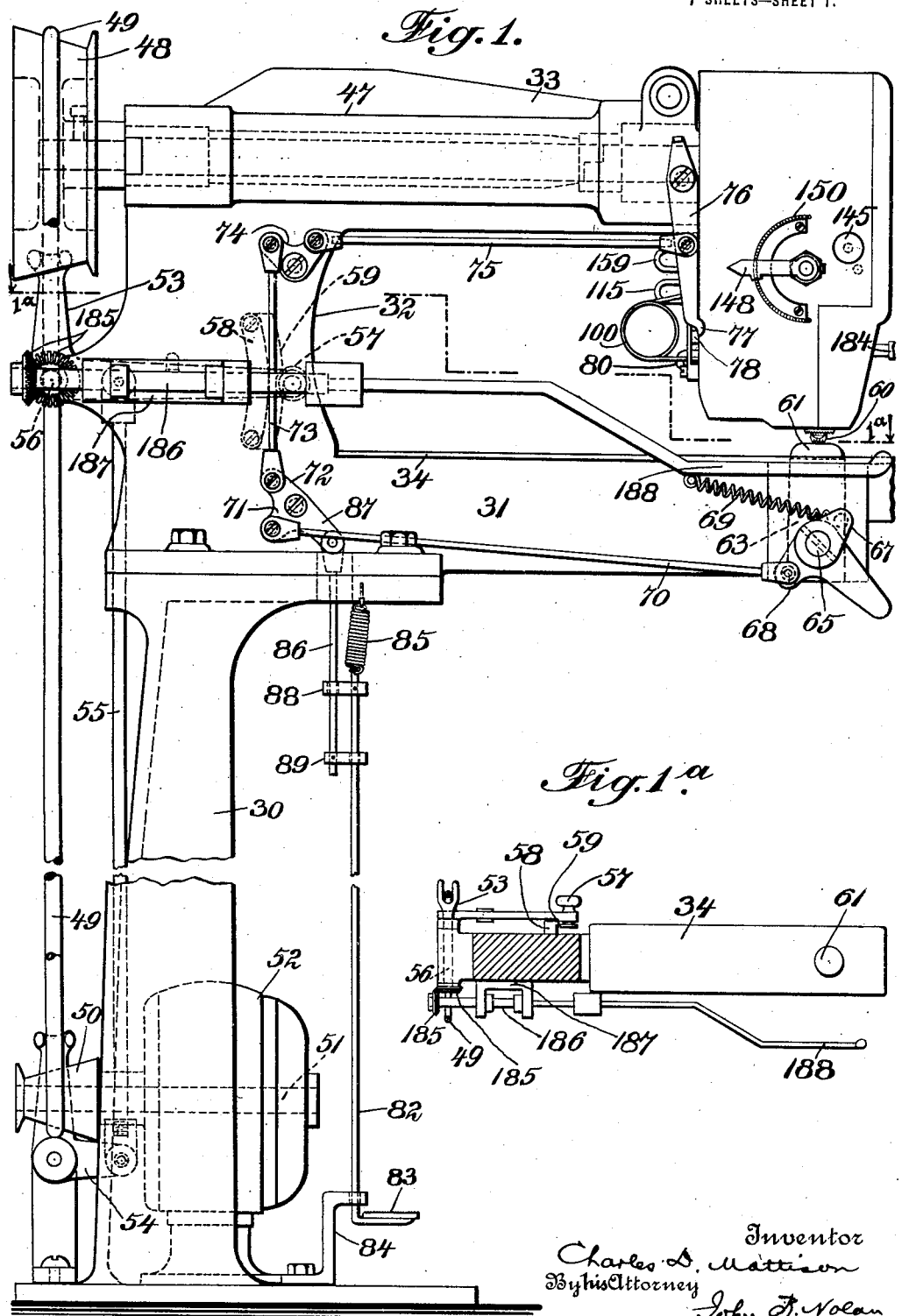
Fig. 1.
Fig. 1.ª
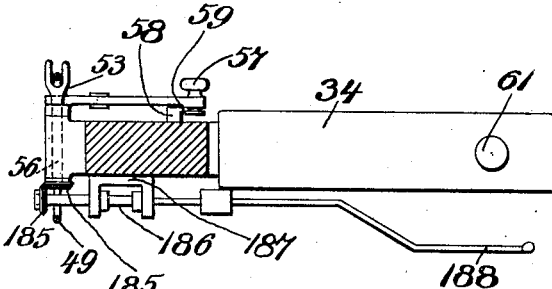
Inventor
Charles D. Mattison
By his Attorney
John F. Nolan

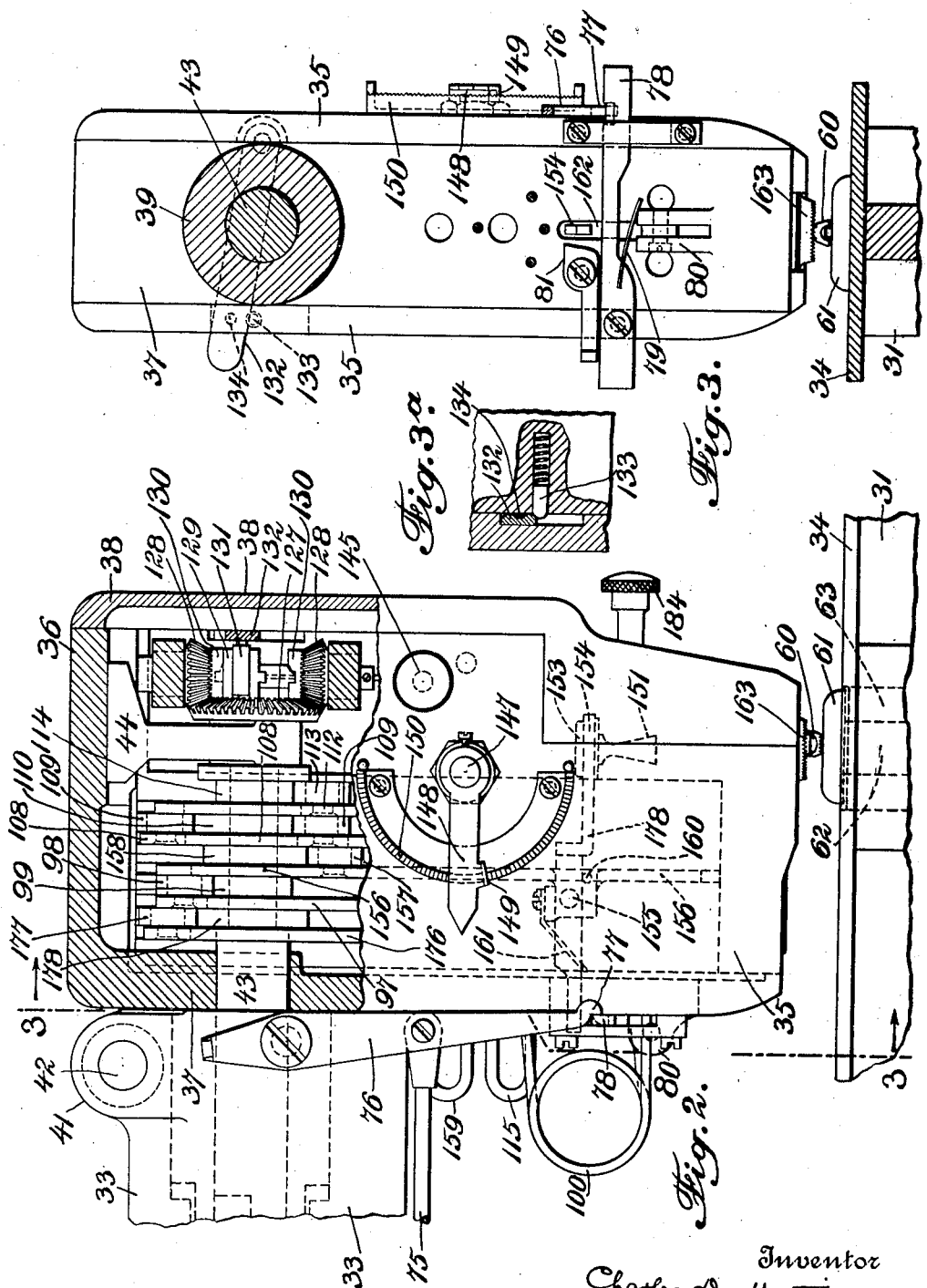

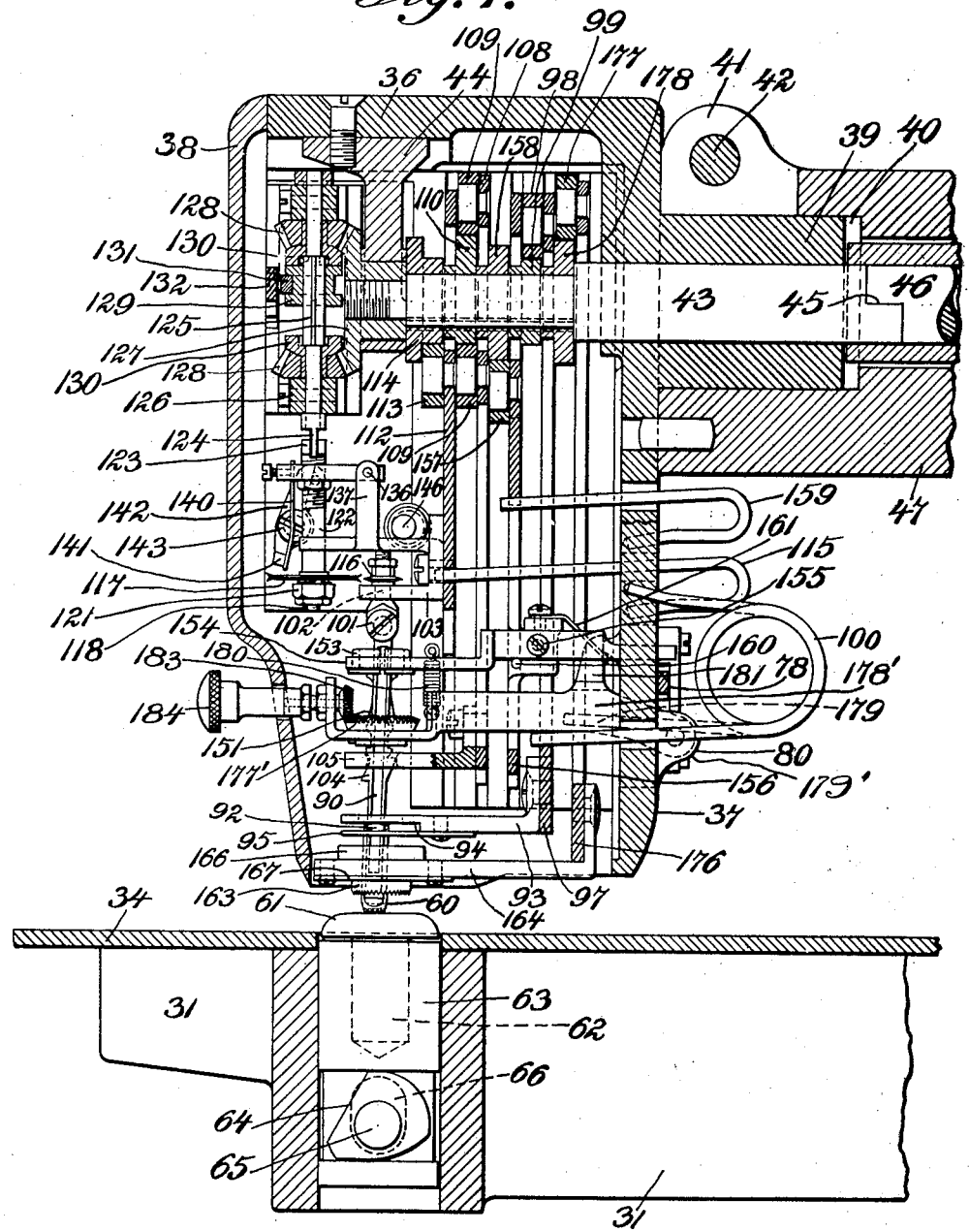

C. D. MATTISON.
TRIMMING MACHINE.
APPLICATION FILED AUG. 23, 1915. RENEWED AUG. 14, 1919.
1,334,044.  
Patented Mar. 16, 1920.  
7 SHEETS—SHEET 4.
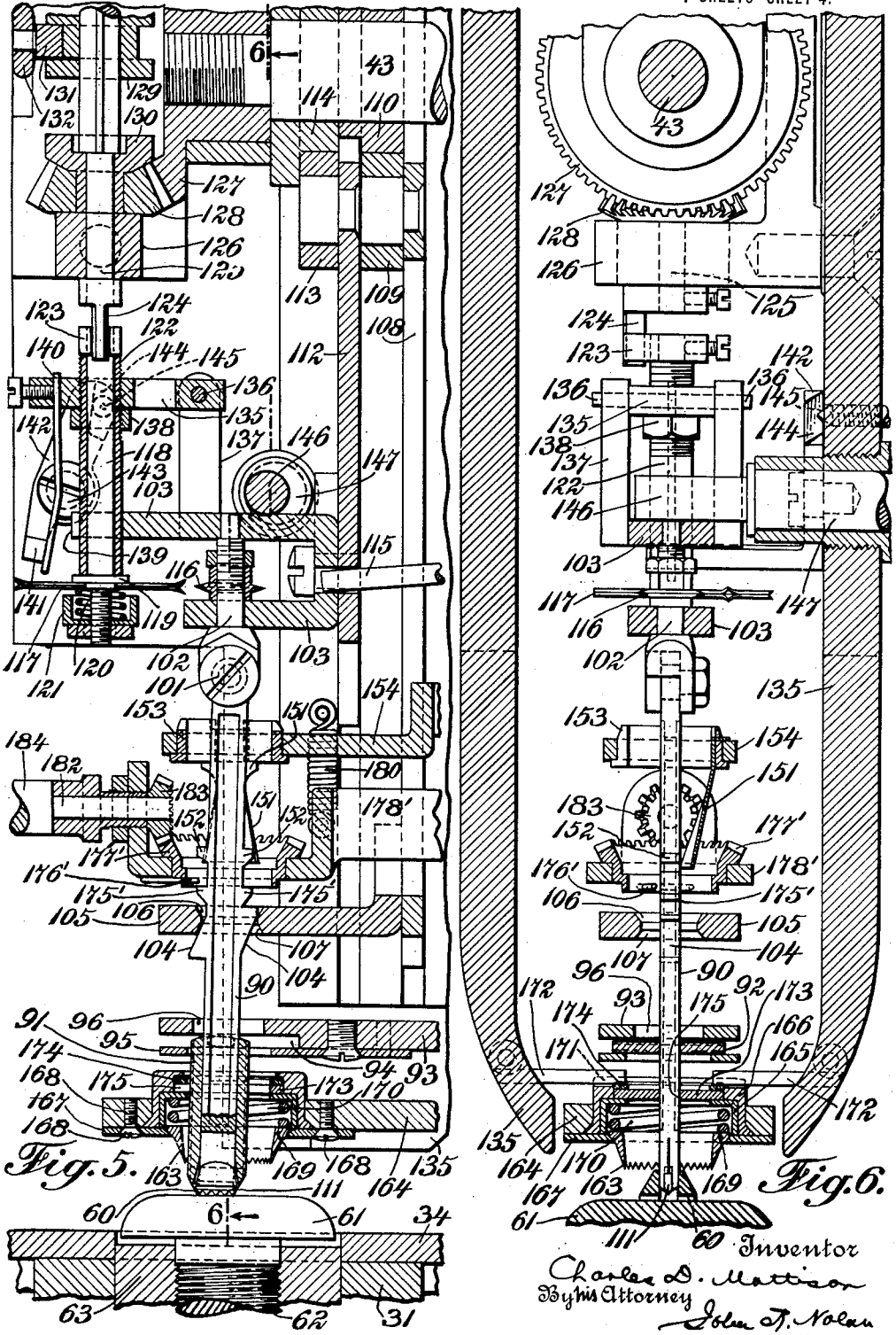

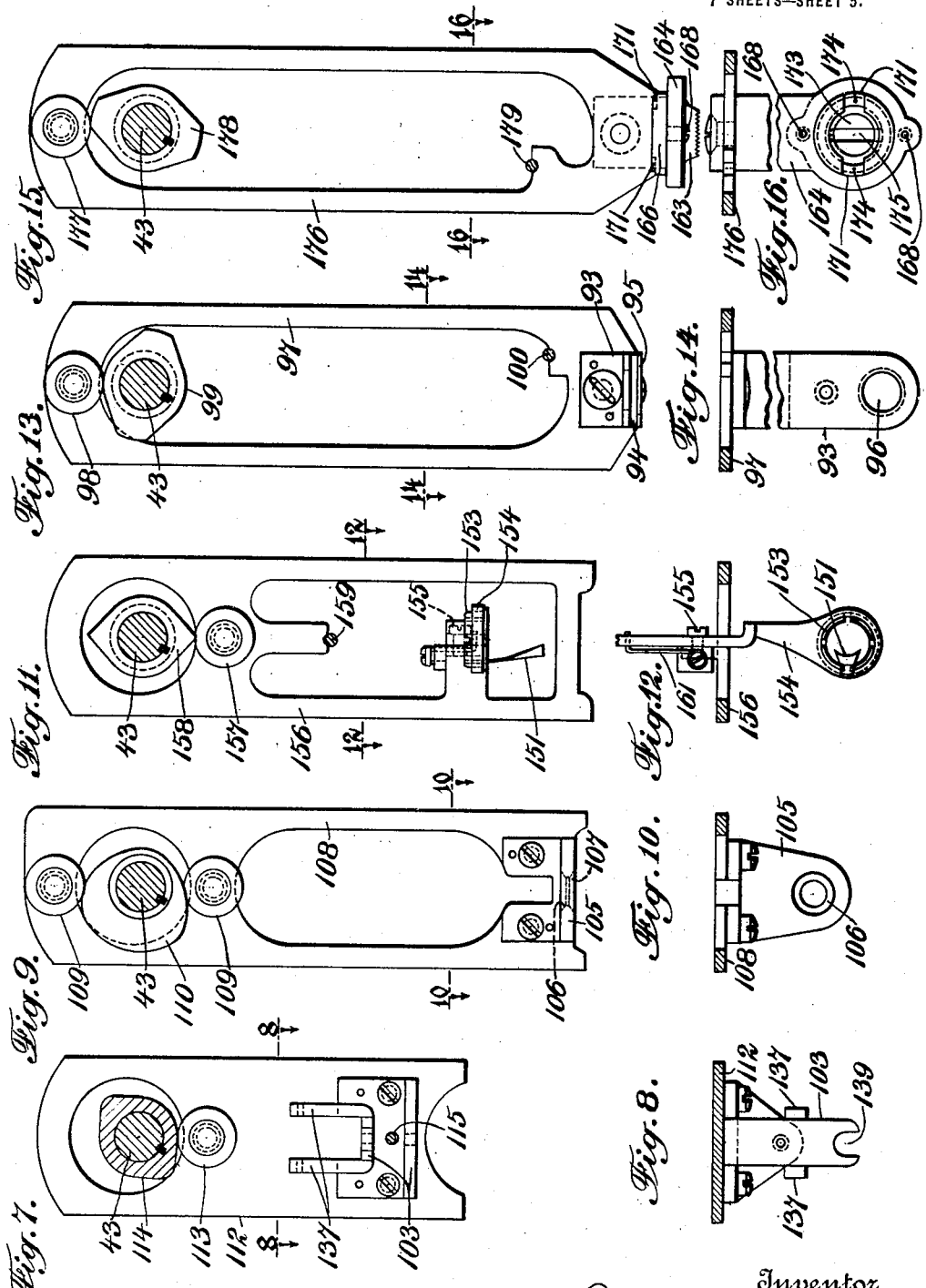

C. D. MATTISON.
TRIMMING MACHINE.
APPLICATION FILED AUG. 23, 1915. RENEWED AUG. 14, 1919.
1,334,044.  Patented Mar. 16, 1920.
7 SHEETS—SHEET 6.
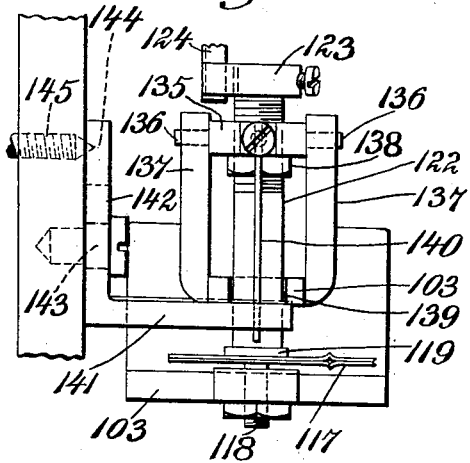
Fig. 17.
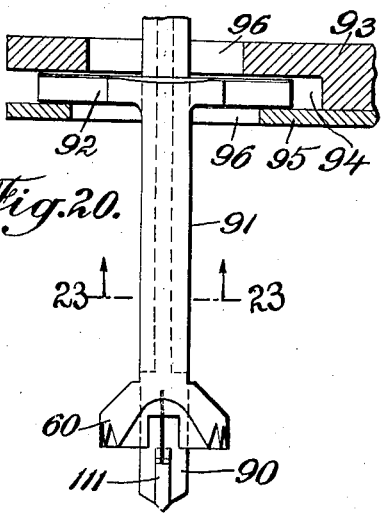
Fig. 20.
Fig. 21.
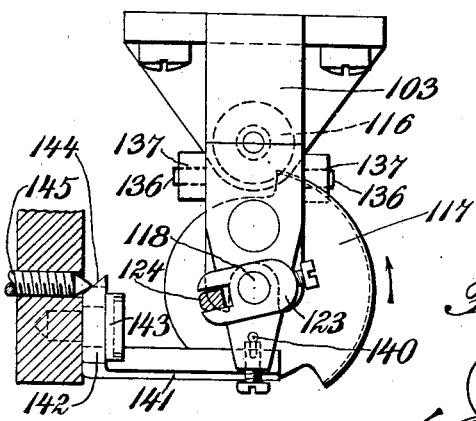
Fig. 18.
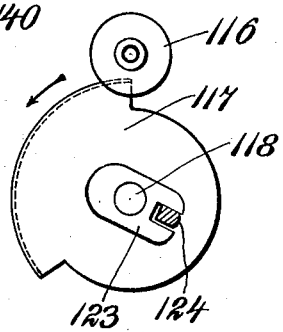
Fig. 19.
Fig. 22.
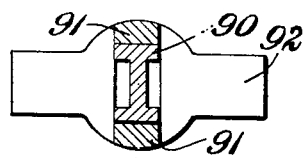
Fig. 23.
Inventor
Charles D. Mattison
By his Attorney
John T. Nolan

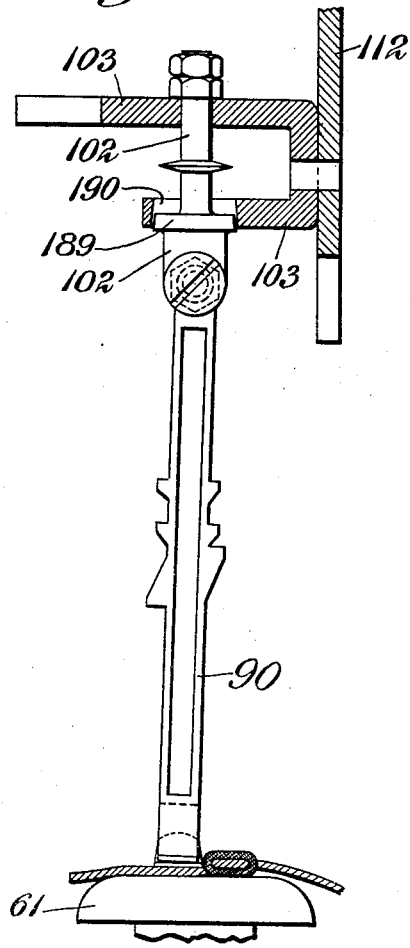
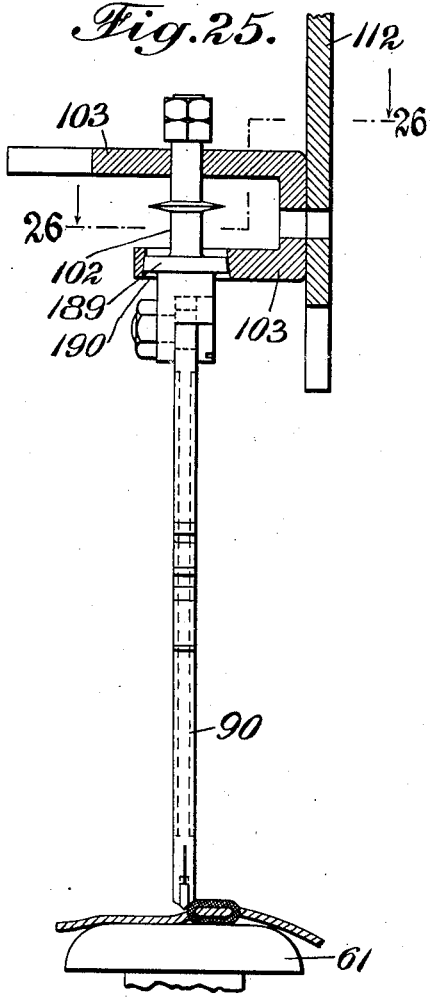
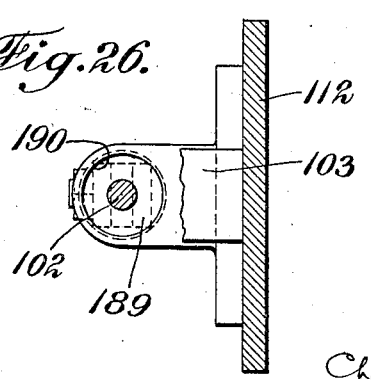

UNITED STATES PATENT OFFICE.

CHARLES D. MATTISON, OF HASBROUCK HEIGHTS, NEW JERSEY, ASSIGNOR TO THE UNITRIM COMPANY, INC., OF NEW YORK, N. Y., A CORPORATION OF NEW YORK.

TRIMMING-MACHINE.

1,334,044. Specification of Letters Patent. Patented Mar. 16, 1920.

Application filed August 23, 1915, Serial No. 46,980. Renewed August 14, 1919. Serial No. 317,588.

*To all whom it may concern:*

Be it known that I, CHARLES D. MATTISON, a citizen of the United States, and resident of Hasbrouck Heights, in the county of Bergen and State of New Jersey, have invented certain new and useful Improvements in Trimming-Machines, of which the following is a specification.

This invention relates to a machine for trimming fabrics having embroidery or other raised work thereon. It has especial relation to an improvement in or modification of the machine forming the subject of my pending application for patent filed February 26, 1917, under Serial No. 151,145, (being a renewal of an application filed December 31, 1913, under Serial No. 809,621,) wherein the trimming of the fabric is effected along a path defined by the contour of the relief or other raised work on the fabric.

The present improvements, while embodying many of the broad principles of construction and operation of the previous machine referred to, particularly the important feature of determining the functional positions of the cutting element by its impingement against the relief of the fabric, concerns certain novel features of construction and combinations of parts whereby greater speed, with proportionate increase of production, is attained, and whereby also a wider range of fabrics, as to character and fineness, may be efficiently operated upon, as will be hereinafter particularly described and claimed.

In the drawings—

Figure 1 is a side elevation of a trimming machine embodying my invention.

Fig. 1ª is a transverse horizontal section, on a reduced scale, as on the line 1—1 of Fig. 1.

Fig. 2 is a side elevation, partly in section, of the machine head, and adjuncts, on a larger scale.

Fig. 3 is a transverse vertical section on a plane adjacent the said head, as on the line 3—3 of Fig. 2.

Fig. 3ª is a sectional detail of clutch-operating lever and means for holding it in positions of adjustment.

Fig. 4 is a longitudinal vertical section, partly in elevation, through the head, and adjuncts.

Fig. 5 is an enlarged vertical section of a part of the head on a plane through the cutter bar, the mechanism for rotating the same, the feed member, the presser foot, and adjacent parts.

Fig. 6 is a vertical section as on the line 6—6 of Fig. 5.

Fig. 7 is a side elevation of a reciprocative frame for supporting and actuating a carriage to which the cutter-bar is pivotally connected. In this view the main shaft and the cam thereon for imparting the down or cutting stroke to the carriage are shown in section, said cam being indicated in the position which it occupies just before effecting the cutting stroke.

Fig. 8 is a transverse section, as on the line 8—8 of Fig. 7.

Fig. 9 is a side elevation of a reciprocative frame for supporting and actuating a cam member which periodically coöperates with cam projections on the cutter-bar so as to impart an oscillatory feed-motion thereto. In this view the main shaft and the cam thereon for reciprocating the frame are shown in section, said cam being indicated as lowering the frame.

Fig. 10 is a transverse section, as on the line 10—10 of Fig. 9.

Fig. 11 is a side elevation of a reciprocative frame for supporting and actuating a pivoted lever carrying a "safety" member with which co-act certain projections on the cutter-bar when the cutter encounters a break or gap in the relief work of the fabric which is being trimmed. In this view the main shaft and the cam thereon for imparting the down strokes to the frame are shown, said cam being indicated in the position which it occupies at the limit of the stroke.

Fig. 12 is a transverse section, as on the line 12—12 of Fig. 11.

Fig. 13 is a side elevation of a reciprocative frame for supporting and actuating a carrying arm for a fabric feed-member on the cutter bar. In this view the main shaft and the cam thereon for imparting the up-strokes to the frame are shown, said cam being indicated in the position which it occupies when the feed-member is down.

Fig. 14 is a transverse section, as on the line 14—14 of Fig. 13.

Fig. 15 is a side elevation of a reciprocative frame for supporting and actuating a carrying arm for presser foot devices which are slidingly connected with the cutter bar. In this view the main shaft and the cam thereon for imparting the up-stroke to the frame are shown, said cam being indicated in the position which it occupies at the limit of the up-stroke of the frame.

Fig. 16 is a transverse section, as on the line 16—16 of Fig. 15.

Fig. 17 is a detail of the carriage for the cutter bar, showing the frictional rotary driving devices for said bar, and also the spring-controlled structure for supporting the driving element.

Fig. 18 is a partial plan of Fig. 17. In this view the frictional driving element is shown as about to engage the driven element.

Fig. 19 is a plan of the driving and driven elements, showing the former as about to be disengaged from the latter.

Fig. 20 is an end elevation of the fabric feed-member on the lower portion of the cutter bar; said member being illustrated as mounted in its apertured supporting arm, and the end of the knife or cutter element being shown.

Fig. 21 is a side elevation of the feed-member, the cutter bar and its knife.

Fig. 22 is a bottom view of Fig. 20, the supporting arm for the feed member being omitted.

Fig. 23 is a transverse horizontal section through the cutter bar and the feed-member, as on the line 23—23 of Fig. 20, the supporting arm for the feed member being also omitted.

Fig. 24 is a view of the cutter bar and adjuncts, equipped with a friction brake for locking the cutter in place when it is positioned laterally against the relief. In this view the cutter is shown as in contact with the relief just before being laterally positioned.

Fig. 25 is a similar view showing the cutter as positioned and locked.

Fig. 26 is a transverse section, as on the line 26—26 of Fig. 25.

Referring to the drawings, 30 designates a standard, upon which is supported a frame structure comprising a horizontal bed 31, an upright 32 at one end thereof, and a horizontal arm 33 projecting from the upright over the bed and carrying at its outer end the machine-head. On the bed is secured a plate 34 which constitutes a worktable. The machine-head includes a casing upon and within which are mounted certain fabric feeding, holding and cutting instrumentalities which will be hereinafter particularly described. In the present instance the casing comprises two side walls 35, a top 36, a back wall 37, and a removable end plate 38, the whole being detachably connected to the frame arm 33 in such a manner that the casing and its appurtenances can be readily applied to or removed from the frame structure, as occasion may require. Accordingly the back wall is provided with a boss 39 which is seated in a corresponding socket 40 in the proximate end of the frame arm, and such end is split to provide two boss-clamping jaws 41 which are connected by a suitable clamp screw 42. The boss provides a bearing for one end of a shaft section 43, the other end of which projects into and has its bearing in a suitably-disposed bracket 44 within the casing. The outer end of this shaft section is provided with a shouldered or step portion 45 which interlocks with the correspondingly formed end portion of a shaft 46 which is journaled in suitably-disposed bearings 47 on the frame arm. (See Figs. 1 and 4.) The section 43 thus constitutes, in effect, a continuation of the shaft 46 when the machine head is applied to the frame arm 33, and yet such section is readily separable from the shaft 46 when the casing is released and removed from the frame structure. The shaft 46 constitutes the main shaft. Its outer end bears a cone pulley 48 which is operatively connected by means of a belt 49 with a cone pulley 50 on a power driven shaft 51 at the foot of the standard; said latter shaft being in the present instance the power shaft of an electric motor 52. The belt is supported and guided adjacent the respective pulleys by shipper members constituted by the up-projecting arms of suitably-disposed bell-crank levers 53, 54 respectively. The other arms of the levers are coupled by means of a link 55, whereby the levers may be oscillated as a unit in order to shift the belt correspondingly on the two pulleys, and thus change the velocity of the main shaft, as occasion may require. The upper lever 53 is borne by a rock-shaft 56 having its bearings in brackets in the frame structure, and the longer arm of the lever is extended adjacent one side of the machine and has screwed thereon a convenient operating handle 57. This arm extends through a guide 58 on the side of the frame, said guide having a suitably-disposed flange or lip 59 against which the handle may be tightly screwed in order to hold the arm in any desired position of adjustment. (See Figs. 1, 1ᵃ.)

Means for automatically operating the shipper lever 53 under conditions hereinafter mentioned will be later explained.

The fabric feed embodies a serrated foot member 60 which is disposed directly above a die-head that is movable vertically in an aperture in the arm 31 and work-table 34. In the present instance the die head comprises a circular plate 61 of hardened steel formed on a screw-threaded shank 62 which is screwed into the internally threaded bore of a cylindrical body 63. This body, which is slidingly fitted for vertical movement in a guide opening in the frame arm and work-table, is recessed to receive an appropriate cam 64 on a transverse shaft 65 journaled in bearings in the arm 31, the body 63 having a slot 66 for the free passage therethrough of the shaft 65. One end of the shaft 65 extends outwardly of the frame arm and is provided with upwardly and downwardly extending crank arms 67, 68 respectively. The upper arm 67 is yieldingly connected to the adjacent side of the frame by a retracting spring 69, the tendency of which is to pull the arm 67 backward and accordingly to turn the shaft 65 and its cam. The contour of the cam is such that when it is retracted by the spring, the body and die-head are in down position with the head flush with the top of the work-table, or substantially so, and that when the cam is turned and held against the action of the spring the body and die-head are raised and the head is maintained above the upper surface of the work-table.

The lower crank arm 68 is connected by means of a link 70 with an arm 71 of a T-lever which is fulcrumed on the side of the frame, whereby when such lever is properly actuated the crank-arm and camshaft are turned in opposition to the spring 69 so as to effect through the action of the cam the elevation of the body 63 and its die-head.

Another arm 72 of the T-lever is connected by means of a link 73 with one arm 74 of a crank lever which is fulcrumed on the side of the frame structure, the other arm of said lever being connected in turn by means of a link 75 with the depending arm of a lever 76 which is fulcrumed on the frame adjacent the head casing. The lower end of the lever 76 is provided with a shouldered portion 77 which is movable toward and from the nose of a latch lever 78 pivoted on the end of the casing. The latch lever is held normally across the path of oscillation of the lever 76 by means of a spring 79 which, being secured to the lever 78, bears against an adjacent stationary bracket member 80 on the casing. The link and lever connections are so coöperatively related to each other that when the lever 76 is engaged by the latch lever 78, the die-head is held in its raised or fabric engaging position against the action of the spring 69. If the latch lever be disengaged from the lever 76, the action of the spring 69 will rotate the cam 64 and thus lower the die-head. On the end of the casing is a cam-lever 81 which may be manually actuated to depress the latch lever and temporarily hold it in unlatching position. (See Figs. 1, 2 and 3.) Under conditions hereinafter mentioned the latch lever 78 is automatically tripped through the operation of certain instrumentalities below described.

I preferably provide a suitable pedal connection with the T-lever, whereby the die-head may be conveniently raised and temporarily held in active position while the lever 76 is unlatched. In the present instance, a vertically-disposed rod 82, bearing at its lower end a pedal 83 is mounted below the work-table. The lower part of the rod is slidingly fitted in a guide bracket 84 at the foot of the standard and the upper end of the rod is attached to the top of the standard by means of a retracting spring 85. Such upper end of the rod is slidingly connected to a rod 86 depending from the third arm 87 of the T-lever, so that when the pedal rod is depressed the upper rod 86 is pulled down thereby and the T-lever is actuated in opposition to the spring 69. The adjacent parts of the two rods have affixed thereto two arms 88, 89, respectively, the free ends of which are perforated for the free sliding connection of the respective rods. (See Fig. 1.)

The fabric feed above referred to is slidingly fitted for relative vertical movement on the lower end of a vertically-disposed cutter bar 90 which has capacity for independent rotary, vibratory and vertical movements. In the present instance the feed comprises the slotted serrated member 60 provided with spaced upstanding arms 91 and a centrally-perforated head-piece 92 which is slidingly and rotatably supported in the recessed portion of a horizontal arm 93 within the head casing. (See Figs. 20 to 23, inclusive.) The arm comprises a main or body portion offset on its underside, as at 94, and provided with a plate 95 which extends below the offset and affords therewith a support for the head piece 92 of the feed dog. The body and plate have circular openings 96 therein for the free passage of the bar 90 and the arms 91 respectively. The arm 93 is secured to a vertical frame 97 which is slidingly fitted to guides in the head casing. This frame 97 has therein a longitudinal opening through which the shaft section 43 freely extends, and the upper portion of the frame is equipped with a lateral roller 98 with which contacts a cam 99 on the said shaft section. The roller is held normally in contact with the cam by the action of a suitable spring 100, one limb of which is secured to the exterior wall 37 of the casing and the other limb extends through an opening in such wall into the casing and bears upon the lower portion of the frame. The contour of the cam is such that in each rotation thereof it acts in conjunction with the spring to impart two reciprocations to the frame, the up strokes being positively accomplished by the cam and the down strokes being yieldingly effected by the spring; these motions being transmitted through the arm 93 to the feed member. (See Figs. 4, 5, 6, 13 and 14.)

The cutter-bar 90 on the lower portion of which the feed member is slidingly mounted, as above mentioned, has capacity for oscillatory or pendulous motion, and accordingly it is hingedly connected, as at 101, to the lower end of a short vertical shaft 102 having its bearings in the spaced horizontal bars 103 of a vertically-reciprocative carriage. The shaft 102 is intermittently rotated and the carriage with its appurtenances is vertically reciprocated at predetermined intervals in relation to the rotation of said shaft, as will be hereinafter described.

On the opposite edges of the body of the bar 90, are formed two corresponding cam inclines 104 which are slidingly fitted in a circular orifice in a horizontal arm 105, the wall of the orifice being oppositely inclined in its upper and lower portions, as at 106, 107 respectively, to correspond with the opposing cam inclines, as seen in Fig. 5. The arm 105 is secured to a vertical frame 108 which is slidingly fitted to guides in the casing. The upper portion of this frame is provided with an orifice through which the shaft section 43 freely extends, and such portion is provided above and below the shaft with two appropriately spaced lateral rollers 109 with which contacts a cam 110 on the shaft section, the contour of the cam being such that in each rotation of the cam the frame 108 and, perforce, the arm 105 are positively reciprocated vertically. In the downward stroke of the arm 105 the lower inclined portion 107 of its orifice wall bears against the opposing cam incline 104 of the cutter-bar and forces the latter in one direction and in the upward stroke of the arm 105 the upper inclined portion 106 of such wall bears against the opposing cam incline 104 of the cutter-bar and forces the bar in an opposite direction. The wall of the cam orifice being circular as above indicated, the cam members 104 of the cutter-bar are free to rotate therein and hence irrespective of the diametrical position of such members in respect to the orifice they are in coöperative relation to the cam wall of the latter.

The lower extremity of the cutter-bar is transversely slotted for the reception of a cutter member 111, which by rapid vertical reciprocation of the bar acts to sever fabric interposed between the said member and the die plate. This cutter member comprises a small section of hardened steel, the lower edge of which, together with the proximate end of the bar, is laterally beveled to provide a knife edge, as seen most clearly in Figs. 20 and 21. The upper edge of the cutter member and the contiguous portion of the slot in the cutter bar are correspondingly rounded, and said member is frictionally supported by and between the side walls of the slot so as to have capacity for slight independent rocking movement about a horizontal axis. By this construction the lower edge of such member will automatically adjust itself to and rest squarely on the surface of the fabric when the cutter bar is rotated to position the knife against the opposing relief as will presently appear.

The vertical reciprocations are transmitted to the cutter bar 90 through the carriage 103 above described. This carriage is attached to a vertical frame 112 which is slidingly fitted to guides in the head casing. The upper portion of this frame is provided similarly to the frame 108, with an orifice through which the shaft section 43 freely extends, and such portion is equipped beneath the shaft section with a lateral roller 113 with which contacts a cam 114 on said shaft section. The roller is held normally in operative contact with the cam by the action of a suitable spring 115, one limb of which is secured to the exterior wall of the casing and the other limb extends through an opening in such wall into the interior of the casing and enters an opening in the lower part of the frame. The contour of the cam is such that in each rotation thereof it acts in conjunction with the spring to impart two timely reciprocations to the frame 112; the down strokes being positively accomplished by the cam and the up strokes being yieldingly effected by the spring, these motions being transmitted to the carriage 103 and its appurtenances, including the pivoted cutter-bar.

When the cutter-bar is raised the knife 111 thereof rests upon but does not clamp the underlying fabric on the die-plate, but when the bar is positively lowered such member severs the opposing fabric upon the die-plate. Preparatory to the feeding motion of the cutter-bar it is in raised position; the frame 108 is also in raised position; the frame 97 with its feed member is in raised position, and a presser foot hereinafter described is in down position in engagement with the fabric. Such presser foot thus holds the material securely in place. The instant the presser foot engages the fabric the cutter bar is rapidly rotated toward the relief by certain friction drive devices hereinafter described, until the side of the cutter member 111 contacts longitudinally with the relief, the latter thus obstructing the path of the knife and causing the temporary slipping of such friction drive devices. When the knife is thus positioned the feed-member, by actuation of its supporting frame 97, is lowered upon the fabric to engage the same, and the presser foot is raised. Thereupon the frame 108 is lowered and a feeding movement imparted to the cutter-bar and the feeder. At the end of the feeding movement, the cutter-bar is lowered by actuation of its carriage 103 through the frame 112, and the positioned knife perforce severs the fabric adjacent to the relief. The cutter-bar is then raised to clear the fabric, the frame 97 is raised to lift the feed member, the presser foot is lowered, and the frame 108 is raised to swing the pendulous cutter-bar and the feed member to their original position for a repetition of the holding, knife-positioning, feeding and cutting operations.

It is to be noted that the opposite sides of the knife edge contact alternately with the opposing relief during the progressive rotation of the cutter-bar, and that when either edge is positioned against the relief, preparatory to the severing operation, the cutter-bar and, perforce, the feed member are advanced, thus feeding the fabric with the positioned cutter thereon to severing position.

The means for rotating the cutter-bar is such that when the travel of the knife is obstructed by the relief as just mentioned, the friction driving element slips in its rotation and becomes temporarily disengaged from the power transmitting element for the cutter bar; such elements however becoming reëngaged preparatory to a succeeding positioning of the cutter against the relief. The cutter rotating means is clearly shown in Figs. 5, 6, 17, 18 and 19, as follows:

Fast on the shaft 102, in the space between the carriage arms 103, is a small bevel-edged disk 116, which is intermittently engaged and rapidly rotated by an adjacent positively driven friction wheel 117. This wheel comprises two superposed mutilated disks on the lower end of a vertical shaft 118 which is positively driven from the shaft section 43. The upper disk of the friction wheel takes against a collar 119 on the shaft 118 and the lower disk of such wheel is pressed against its companion by the action of an underlying spring 120 which is seated in a cup 121 on the lower end of the shaft. The edges of the acting segmental portions of the wheel disks are slightly flared, as shown, and they are so disposed in respect to the driven disk 116 as to engage in their rotation the opposing edge of the latter and tend to rotate the disk 116 by frictional contact. The acting portion of the friction wheel is comprised within about one-third of the circumference of the wheel, and the relation of such portion to the circumference of the disk 116 is such that in each rotation of the wheel such portion tends to rotate the disk one complete rotation, and thus permit the knife to swing laterally against the opposing relief irrespective of the angularity of the latter in respect to the axis of rotation of the knife. When the knife is thus positioned against the relief the disk is positively held against rotation and hence the functional edge of the friction wheel simply slides on and past the disk 116, whereupon the mutilated segment of the drive wheel turns idly adjacent the disk until the acting portion of the wheel reëngages the disk. While the friction wheel is free from the disk 116, the cutter-bar is sharply reciprocated through the influence of the cam and spring mechanism on the frame 112, it being noted that the contour of the cam 114 is such that the cutter-bar is maintained in raised position until the knife is again positioned against the succeeding portion of the relief and the acting edge of the driving wheel is free from the disk 116.

The shaft 118 bearing the driving wheel 117, is mounted to rotate in a bushing 122 which is suitably supported in the carriage 103. On the upper end of the shaft 118 is secured a crank-arm 123 having its outer end bifurcated for the reception of the reduced or tang-shaped lower end 124 of a vertical shaft 125 which is mounted in a bearing bracket 126 adjacent the iner end of the shaft section 43. Thus a sliding connection is had between the shaft 125 and the crank shaft 118 to accommodate the vertical movement of the latter by the carriage 103. The shaft 125 is geared with the main shaft as follows: (See Figs. 2, 4, 5 and 6.)

The inner end of the shaft section 43 has fast thereon a bevel gear wheel 127 which meshes with oppositely-disposed bevel pinions 128 loosely mounted on the shaft 125. Splined on the latter shaft, between the pinions, is a clutch member 129 which may be moved into and from engagement with opposing clutch elements 130 on the respective pinions, or be moved midway between the pinions. When the clutch is in the middle position both pinions are loosely rotated by the bevel wheel on the shaft section 43; and when the clutch is engaged with either of the pinions the bevel wheel rotates the vertical shaft 125 through the locked pinion, to the right or left, according to the pinion in action. The rotary yoke 131 of the clutch member 129 is pivotally connected to a lever arm 132 the free end of which extends through a slot in the wall of the head casing, and affords a convenient means for setting the clutch. Seated in a socket in the casing wall, adjacent the lever, is a spring pressed plunger 133 which is adapted to engage the lever and lock it in position with the clutch disengaged from both or engaged with either of the pinions. When the lever is in neutral position the plunger registers with a socket as 134 in the side of the lever, and when the lever is up or down the plunger engages the lower or the upper edge of the lever as the case may be. (See Figs. 3, 3ª.)

During the regular operation of the machine the upper pinion 128 is clutched to the shaft 125 and the latter is driven accordingly. This condition is assumed in the present description of the operation of the machine. If, however, for any reason it be required to reverse the operation of the machine the lower instead of the upper pinion may be readily clutched to the shaft 125. For example, in the trimming of relatively long fabric, where it is required to trim the same in one direction throughout its length and then proceed with the trimming of the fabric in the opposite direction, it is merely necessary upon the completion of the trimming operation in one direction to engage the cutter with the other or return portion of the relief and reverse the operation of the machine.

The angular relation of the crank 123 to the acting portion of the friction drive wheel 117 is such that as such portion approaches and engages the disk 116 in the regular operation of the machine, the crank is in position to apply the maximum turning force of the wheel to the disk, and as such portion reaches the end of its active engagement with the disk the crank is in position to apply the minimum force of the drive wheel to the disk, and hence the drive wheel in each rotation thereof escapes the driven wheel with a smooth easy movement.

As a simple and efficient means to adjust the engaging pressure of the drive wheel on the driven wheel to lessen the driving power, I provide the following construction: The upper portion of the bushing 122 is threaded and screwed into a tapped orifice in the body of an arm 135 which is pivotally supported at one end, as at 136, between a pair of posts 137 on the carriage 103, the bushing being provided with a jam nut 138 to lock it in its position of vertical adjustment on the arm 135. The lower portion of the bushing is loosely fitted to a guide slot 139 in an extension of one of the arms of the carriage, so as to be movable, within limits, toward and from axis of the driven wheel. Secured to the outer end of the arm 135 is the upper end of a depending leaf spring 140, the lower end of which contacts with the angular extension 141 of the lower arm of a rock-lever 142 which is fulcrumed as at 143, on the adjacent inner wall of the head casing. The upper arm of the lever is provided with a beveled surface 144 with which engages the point of a set-screw 145 mounted in the wall of the casing, so that by manipulation of the screw against the opposing beveled surface the lever may be nicely moved on its pivot to increase or decrease the pressure of the spring 140 on the pivoted arm 135 and the bushing, and thus regulate to a nicety the peripheral pressure of the driving wheel on the driven wheel. (See Figs. 4, 5 and 6.)

In order to regulate the extent of upward movement of the carriage and its appurtenances, and thereby adjust the upward stroke of the cutter to accord with the thickness of the fabric being trimmed, I provide an adjustable stop which overhangs the upper arm 103 of the carriage. In the present instance this stop comprises the eccentric extension 146 of a stud 147 which has its bearing in a wall of the casing. The stud projects exteriorly of the casing and bears a spring arm 148 having a catch 149 which is yieldingly held in engagement with a toothed segment 150 on the side of the casing. The arm 149 may be turned so as to rotate the stud 147 in either direction on its axis and thus accordingly vary the plane of contact of the eccentric 146 with the carriage; the spring catch automatically engaging the toothed segment and thus securely locking the parts in their position of adjustment. (See Figs. 2 to 6 inclusive).

Inasmuch as the position of the cutter for the severing operation is determined by the lateral contact of the cutter with the relief and as the cutter bar has capacity for a complete rotation on its axis, it is evident that if the continuity of the relief be broken the cutter upon encountering such defective spot will swing into the gap and be thereby diverted from its proper path. To obviate liability of any such improper operation of the cutter, I provide means operative automatically under the conditions mentioned to trip the latch lever 78 hereinbefore described, and thus insure the lowering of the die-head and the superposed portion of the fabric. Such means includes a depending segmental plate 151 supported adjacent a pair of oppositely-disposed studs 152 on the cutter-bar by means of a ring 153 which is adjustably held in an aperture in one arm of a horizontal lever 154 fulcrumed, as at 155, to a vertical frame 156. This frame is slidingly fitted to guides in the casing, and its upper portion is provided with an orifice through which the main shaft section 43 freely extends, such portion being equipped beneath the shaft with a lateral roller 157 with which contacts a cam 158 on the shaft section. The roller is held in operative contact with the cam by the action of a suitable spring 159, one limb of which is secured to the exterior wall of the casing and the other limb extends through an opening in such wall into the interior of the casing and engages a portion of the frame 156. The contour of the cam is such that in each rotation thereof it acts in conjunction with the spring to impart two timely reciprocations to the frame; the down strokes being positively accomplished by the cam and the up strokes being yieldingly effected by the spring; these motions being transmitted to the lever 154 and the elements carried thereby.

A lateral stop 160 on the frame limits the downward movement of the forward arm of the lever and, in conjunction with a suitably-disposed spring 161 which acts against the under side of the other arm, maintains the lever in horizontal position although permitting movement of the lever to raise its forward arm. The other arm of the lever extends freely through a vertical slot 162 in the end wall of the casing so as to overhang the latch-lever. (See Figs. 2, 3 and 4.)

During the normal operation of the machine the outwardly projecting lever arm remains above the latch lever 78, but in the event of the cutter swinging into a break or gap in the relief as above mentioned, and thus exceeding, say, two-thirds of a rotation, one of the studs 152 on the cutter bar passes to a position below the lower edge of the plate 151 and acts as an abutment or support for the plate. Hence in the downward movement of the frame 156 the other or unsupported arm of the lever 154 is swung downward against the action of the spring 161, so as to bear upon the latch-lever 78 with the result stated.

The presser means hereinbefore referred to for holding the fabric in position while the cutter is being positioned against the relief is as follows:

163 designates a hollow conoidal foot having a serrated lower edge; and 164 designates a vertically-reciprocative arm in which the foot is mounted and by actuation of which its serrated edge is moved upon and from the fabric. The foot is arranged to slide vertically in a cap structure which is snugly fitted in an orifice in the arm. This cap structure comprises inner and outer members 165, 166 respectively, the latter having around its lower edge a flange which is seated in the counter-sunk lower edge of the orifice of the arm and is fixedly held therein by an underlying ring 167 which is fastened to the arm by screws 168 or the like. The inner edge of this ring affords a seat for the externally flanged upper edge 169 of the serrated presser foot. The two cap members are internally flanged at top, and a spring 170 contained in the inner member bears against the opposing flange of the latter and the top of the serrated foot, so as to maintain such foot yieldingly seated.

The top of the outer cap member is provided with radial sockets 171 and the side walls of the casing have affixed thereto inwardly projecting arms 172 which overhang the cap structure, and are so disposed that when the arm 164 is raised, they register with the sockets. The flange of the inner cap member is slightly wider than that of the outer member to provide a seat for a disk 173, between which and the overhanging arms 172 is interposed a friction ring 174, which bears against said arms when the cap structure is raised.

This disk has therein a diametrical slot 175 through which the cutter-bar and feed member slidingly extend; the dimensions of the slot relative to the cross-sectional area of the cutter bar being such that the disk, bar and feed-member are vertically movable independently of each other, and that the disk partakes of the rotary movement of the cutter-bar yet allows the swinging feeding motion of the latter.

The arm 164 is secured to the lower end of a vertically-movable frame 176 which is slidingly fitted to guides in the head casing. This frame has therein, similarly to the frame 97, a longitudinal opening through which the main shaft section freely extends, and the upper portion of the frame is equipped with a lateral roller 177 with which contacts a cam 178 on the said shaft section. The roller is held normally in contact with the cam by the action of a suitable spring 179, one limb of which is secured to the exterior wall of the casing and the other limb extends through an opening in such wall into the casing and bears upon a shoulder in the lower portion of the frame. The contour of the cam 178 is such that in each rotation thereof it acts in conjunction with the spring to impart two timely reciprocations to the frame, the up-strokes being positively accomplished by the cam and the down strokes being yieldingly effected by the spring; these motions being transmitted through the arm and adjuncts to the serrated foot. See Figs. 4–6, 15 and 16.)

When the arm 164 is in up-position the serrated foot 163 is free of the fabric, the arm 172 being seated in the sockets of the cap structure and the friction ring 174 being hard against the opposing parts of such arm 172. Thus rotation of the disk 173 is prevented, and, by virtue of the slot in the latter through which the cutter bar extends, said bar is held against rotary movement. At this juncture the cutter is in raised position, and the feed-member is lowered upon the fabric. This done, the arm 164 is lowered and the serrated edge of the spring-pressed foot effectually bites and holds the underlying fabric in position. Thereupon the cutter bar is rotated as above mentioned until its side stops against the opposing relief, the disk 173, being unrestrained, turning freely with the cutter bar; following which the sequential operations above described are performed.

To insure the initial positioning of the relief against the end of the cutter, provision is had whereby the cutter bar, preparatory to the trimming operation, severs the fabric diagonally until the relief contacts with the cutter. Accordingly the cutter bar is provided with laterally-extending studs 175' into the rotary path of which a stop-pin 176' is adapted to be set in order temporarily to define the position of the cutter-bar and therefore the direction of feed and cut. The pin 176' is carried by the depending hollow hub of a bevel-gear wheel 177' which encircles the cutter bar and is seated in the apertured end of a yieldingly-supported arm 178'. The other end of the arm is pivoted to a lug 179' exteriorly of the casing, and the arm is held yieldingly in horizontal position by means of a spring 180 secured thereto and to an adjacent part of the casing. A lug 181 on the arm abuts against a stop on the inner wall of the casing and thus limits the upward movement of the arm, in which position the stop pin 176' is above the rotary path of the studs 175'. The inner end of the arm 178' is provided with an upwardly bent portion in an orifice in which is seated a shaft 182 bearing a pinion 183 in mesh with the spur wheel 177'. The shaft 182 is provided with a handle part 184 which extends outwardly through an orifice in the adjacent wall of the casing, so that by properly turning such part the pinion may be correspondingly turned to rotate the wheel 177' and thus adjust the stop-pin 176' to the desired position for engagement by either of the studs 175' on the cutter bar. This done the arm is manually depressed to dispose the pin 176' in the path of the studs 175'. When one of the studs impinges against the opposing stop-pin, the rotation of the bar by the frictional turning mechanism above described is prevented. The machine is started with the stop-pin properly adjusted and held in the path of the studs, and thus the cutter severs the fabric on a line diagonally of the direction of travel of the fabric until the cutter contacts with the relief. Thereupon the arm 178' is released and permitted to resume its normal position with the stop-pin above the path of the studs, thus permitting the machine to perform its trimming operation along the boundary defined by the relief.

In order to insure uniformity of speed of the machines when a series of them are operating simultaneously upon the same length of fabric, I provide each of the machines with the means hereinbefore mentioned for automatically operating the belt shipper lever 53, as follows: 185 designates two meshing bevel gear wheels, one of which is affixed to the rock-shaft 56 of the upper shipper lever, and the other of which wheels is affixed to a horizontal shaft 186 having its bearings in a bracket 187 on the adjacent side of the frame structure. The shaft 186 extends toward the casing and its inner end carries a crank-like member having a horizontal arm 188 which lies adjacent the forward edge of the work table. Hence by raising or lowering the arm 188 the shaft 187 and its gear wheel are partially turned in either direction, thus moving the shipper lever and accordingly adjusting the band on the cone pulleys to vary the speed of the machine as above stated. (See Figs. 1, 1$^a$.)

The fabric in its path to and through the successive machines travels under the succeeding crank arms and controls the horizontal level of the latter, and, perforce, the speed of the machines; that is to say, if the speed of a machine exceeds that of the other or others, the fabric, being taken up more rapidly by the speeding machine, will be drawn under tension beneath the crank arm of the latter and thus lift said arm and effect a reducing movement of the shipper upon the driving belt.

In Figs. 24, 25 and 26, I have illustrated the cutting devices as equipped with a friction brake which is constructed and arranged to lock the cutter bar and its appurtenances in place when a side of the knife is positioned against the relief. This brake includes a bevel edged collar 189 formed on the shaft member 102 to which the upper end of the cutter bar is pivoted, such collar being fitted for limited vertical movement in a correspondingly beveled aperture 190 in the lower arm 103 of the vertically-reciprocative carriage. The upper end of the shaft 102 is slidingly supported in the upper arm 103 of the carriage, and hence the cutter bar, its knife and the shaft member have capacity for slight vertical movement. When the lower edge of the knife rests upon the top of the fabric and the end of the knife is in contact with the relief, the collar is out of frictional contact with the wall of the aperture, as seen in Fig. 24, but when the cutter bar is rotated by the friction drive to position the beveled side of the knife longitudinally against the relief, such beveled surface is slightly raised by its impact against the relief, thus raising the cutter bar and its supporting shaft section in a manner to bind the inclined collar against the opposing wall of the aperture, as seen in Fig. 25. The knife is thus effectually locked in cutting position preparatory to the cutting stroke.

I claim as my invention—

1. In a machine of the class described, a cutter having a rotary positioning movement the extent of which is determined by the projecting surface configuration of the material to be severed, means for progressively rotating said cutter to present the opposite sides of its cutting portion to the opposing surface configuration, a die-member, and means for imparting a relative cutting movement between the positioned cutter and said member.

2. In a machine of the class described, a cutter having a rotary positioning movement and a relative longitudinal cutting movement, the extent of the former being determined by the projecting surface configuration of the material to be severed, means for progressively rotating said cutter to present the opposite sides of its cutting portion to the opposing surface configuration, and means for imparting the cutting movement to the positioned cutter.

3. In a machine of the class described, a cutter having a rotary positioning movement and a relative longitudinal cutting movement, the extent of the former being determined by the projecting surface configuration of the material to be severed, friction means for progressively rotating said cutter to present the opposite sides of its cutting portion to the opposing surface configuration, and means for imparting the cutting movement to the positioned cutter.

4. In a machine of the class described, the combination with a cutter, of means for rotating the same comprising driving and driven elements so constructed that when the path of rotation of the cutter is obstructed by the surface relief of the fabric the driving element continues its rotation.

5. In a machine of the class described, the combination with a cutter, of means for rotating the same comprising driving and driven elements so constructed that when the path of rotation of the cutter is obstructed by the surface relief of the fabric the driving element continues its rotation and becomes temporarily disengaged from the driven element.

6. In a machine of the class described, a cutter having a rotary positioning movement and a relative longitudinal cutting movement, the extent of the former being determined by the projecting surface configuration of the material to be severed, means for rotating said cutter to present the opposite sides of its cutting portion to the opposing surface configuration, said means including a rotary friction member on the cutter, a friction driver for said member, means for actuating said driver, and means for imparting a cutting movement to the positioned cutter.

7. In a machine of the class described, the combination with a rotary cutter, of means for rotating the same, including a friction driving wheel and a disk driven thereby, the acting peripheral portion of the driving wheel being fashioned to escape the disk after a predetermined extent of engagement therewith in each rotation of the wheel.

8. In a machine of the class described, the combination with a rotary cutter bar, of means for rotating the same, including a friction driving wheel, an operating crank connection for said wheel, and a disk driven by said wheel, the acting peripheral portion of the said wheel being mutilated so as to escape the disk after a predetermined extent of engagement therewith in each rotation of the wheel.

9. In a machine of the class described, the combination with a rotary cutter bar, of means for rotating the same comprising frictional driving and driven elements so constructed that when the travel of the cutter is obstructed by the surface relief of the fabric the driving element continues its rotation, and means for regulating the peripheral pressure of the driving element on the driven element.

10. In a machine of the class described, the combination with feed mechanism, including a feed element for engaging and advancing the fabric, of cutter mechanism, including a cutter element, and means whereby said feed and cutter elements are actuated to move in the direction of feed of the fabric and back again.

11. In a machine of the class described, the combination with cutting mechanism, including a rotary pendulous cutter bar, and means for oscillating said bar, of feed mechanism, including a feed member connected with and operable by the oscillatory motion of said cutter bar.

12. In a machine of the class described, a cutter mechanism for imparting thereto independent rotary, vibratory and longitudinal movements, a feed member operable by said cutter, and means for imparting independent movement to the said member longitudinally of the cutter.

13. In a machine of the class described, a cutter bar, a rotary element to which said bar is pivoted, means for rotating said element to cause its cutting portion to impinge against the relief of the fabric to be severed, and means for positively swinging said bar on its pivotal connection with said element irrespective of the angularity of the cutting portion of the bar.

14. In a machine of the class described, a cutter bar, a rotary element to which said bar is pivoted, means for rotating said element to cause its cutting portion to impinge against the relief of the fabric to be severed, means for positively swinging said bar on its pivotal connection with said element irrespective of the angularity of the cutting portion of the bar, a feed member carried by said bar, and means for imparting independent movement to the said member longitudinally of the said bar.

15. In a machine of the class described, a rotary cutter having a rotary positioning movement and a relative longitudinal cutting movement, the extent of the former being determined by the projecting surface configuration of the material to be severed, means for rotating said cutter to present its cutting portion laterally of the opposing surface configuration, means for temporarily locking the cutter in position against such configuration, and means for imparting the cutting movement to the positioned cutter.

16. In a machine of the class described, the combination with cutting mechanism, including a rotary cutter, of presser mechanism, including a fabric engaging and disengaging member, and means whereby the cutter is locked against rotary movement when the said member is disengaged from the fabric but is free to rotate when the member is engaged with the fabric.

17. In a machine of the class described, the combination with fabric feed mechanism, of a cutter mechanism, including a cutter element and means whereby said element is actuated to move with the fabric during the feeding operation and is then returned to its previous position, and presser mechanism, including a presser element, and means whereby said element is actuated to engage and release the fabric at the end of each feeding impulse.

18. In a machine of the class described, the combination with cutting mechanism, including a cutter mounted for rotary and swinging movements, of feed mechanism, including a feed member connected with said cutter to partake of the swinging movements thereof, and presser mechanism, including a fabric engaging and disengaging member, and means whereby the cutter is locked against rotary movement when the said member is disengaged from the fabric but is free to rotate when the member is engaged with the fabric.

19. In a machine of the class described, a cutter, mechanism for imparting thereto independent rotary, vibratory and longitudinal movements, a feed member operable by said cutter, means for imparting independent movement to the said member longitudinally of the cutter, a presser foot, and means for actuating the same relatively to the feed member and cutter.

20. In a machine of the class described, a rotary cutter bar, means for rotating the same, presser mechanism including a foot, means for moving said foot into and out of engagement with the fabric, and means whereby the cutter is locked against rotary movement when the foot is disengaged from the fabric but is free to rotate when the foot is engaged with the fabric.

21. In a machine of the class described, a cutter, means for imparting thereto independent rotary, oscillatory and longitudinal movements, a feed member operable by said cutter, means for imparting independent movement to the said member longitudinally of the cutter, a presser mechanism including a foot, means for moving said foot into and out of engagement with the fabric, and means whereby the cutter is locked against rotary movement and is free to oscillate when the foot is disengaged from the fabric, but is free to rotate when the foot is engaged with the fabric.

22. In a machine of the class described, a cutter bar having cam portions and a cutting portion, a rotary element to which the bar is pivoted, means for rotating said element, a cam member adapted to co-act with the cam portions of the cutter bar, and means for actuating said cam member at intervals to effect the oscillation of the cutter bar.

23. In a machine of the class described, the combination with a rotary pendulous cutter bar, of a support therefor, means for vertically reciprocating said support, means for rotating said bar, adjustable means for limiting the upward movement of said support, means for oscillating the cutter bar, and a feed member connected with and operable by the oscillatory motion of the said cutter bar.

24. In a machine of the class described, the combination with a rotary pendulous cutter bar, of a support therefor, means for vertically reciprocating said support, including a cam for imparting a downward stroke to the support and a spring for yieldingly raising the support, adjustable means for limiting the upward movement of said support, means for rotating the said bar, means for oscillating the said bar, and a feed member connected with and operable by the oscillatory motion of the said bar.

25. In a machine of the character described, the combination with a rotary pendulous cutter bar, of a support therefor, means for vertically reciprocating said support, including a cam for imparting a downward stroke to the support and a spring for yieldingly raising the support, an adjustable stop for limiting the upward movement of the support, said stop including an eccentric and means for adjusting the same, means for rotating the said bar, means for oscillating the said bar, and a feed member connected with and operable by the oscillatory motion of the said bar.

26. In a machine of the class described, a cutter having capacity for rotary positioning movement and relative longitudinal cutting movement, means for rotating said cutter to severing position, means for imparting the cutting movement to the positioned cutter, a die member, and means whereby it may be moved toward and from the cutter, said last-named means including devices which are actuated to effect the movement of the die-member from the cutter when the rotary positioning movement of the cutter exceeds a predetermined angle.

27. In a machine of the class described, a cutter having capacity for rotary positioning movement and relative longitudinal cutting movement, means for rotating said cutter to severing position, means for imparting the cutting movement to the positioned cutter, and means whereby the effective cutting action of the cutter is prevented when the rotary positioning movement of the cutter exceeds a predetermined angle.

28. In a machine of the class described, a cutter having capacity for rotary positioning movement and relative longitudinal cutting movement, means for rotating said cutter to severing position, means for imparting the cutting movement to the positioned cutter, a die head in coöperative relation to the cutter, and means whereby said head may be moved toward and from the cutter, said last-named means being operative through the cutter to move the head away from the latter when the rotary positioning movement of the cutter exceeds a predetermined angle.

29. In a machine of the class described, a cutter having capacity for rotary positioning movement and relative longitudinal cutting movement, means for rotating said cutter to severing position, means for imparting the cutting movement to the positioned cutter, a die-head in coöperative relation to the cutter, yielding means tending to move said head away from the cutter, means for temporarily locking said head toward the cutter against the action of said yielding means, and means for automatically unlocking said head when the rotary positioning movement of the cutter exceeds a predetermined angle.

30. In a machine of the class described, a cutter having capacity for rotary positioning movement and relative longitudinal cutting movement, means for rotating said cutter to severing position, means for imparting the cutting movement to the positioned cutter, a die-head in coöperative relation to the cutter, yielding means tending to move said head away from the cutter, means for temporarily locking said head toward the cutter against the action of said yielding means, means for automatically unlocking said head when the rotary positioning movement of the cutter exceeds a predetermined angle, and means whereby the head can be moved and temporarily held toward the cutter when the head is unlocked.

31. In a machine of the class described a cutter bar having capacity for rotary positioning movement and relative longitudinal cutting movement, said bar having an abutment, means for rotating said cutter bar to severing position, means for imparting the cutting movement to the positioned cutter bar, a depending segmental member supported adjacent the said abutment, a lever upon which said member is supported, a vertically-reciprocative frame for the lever, means for reciprocating said frame, whereby the said member is moved into the path of the abutment on the cutter bar, a diehead, means whereby it may be moved toward and from the cutter bar, and trip connections between said last-named means and the said lever.

32. In a machine of the class described, a rotary pendulous cutter bar bearing a loosely mounted automatically adjustable cutter member, means for rotating said bar to position the said member laterally of the surface configuration of the material to be severed, and means for imparting a cutting movement to the cutter bar when said member is thus positioned.

33. In a machine of the class described, the combination of feed mechanism, cutting mechanism including a rotary cutting element having a stop, frictional means for progressively rotating said element to present its cutting portion to the opposing surface configuration of the fabric, and manually operative means having an adjustable stop movable into the path of the stop on the cutting element for temporarily limiting the extent of rotation of the cutting element.

34. In a machine of the class described having feeding mechanism and cutting mechanism, the combination with driving mechanism having variable speed devices, of means under the influence of the fabric for actuating said devices to control the speed of the machine.

35. In a machine of the class described having feeding mechanism and cutting mechanism, the combination with driving mechanism including a cone pulley, a driving belt thereon, and an oscillatory shipper for the belt, of gearing for moving said shipper, and a shaft for actuating said gearing having a crank extension with which the fabric contacts in its travel to the feeding and cutting mechanisms.

Signed at New York, in the county and State of New York, this 13th day of August, A. D. 1915.

CHARLES D. MATTISON.